Feb. 27, 1962 J. R. WEST 3,022,882
INFEED MECHANISM
Filed Dec. 19, 1957 2 Sheets-Sheet 1

INVENTOR
JAMES R. WEST
Joseph Allen Brown
ATTORNEY

Feb. 27, 1962

J. R. WEST 3,022,882

INFEED MECHANISM

Filed Dec. 19, 1957

INVENTOR
JAMES R. WEST

Joseph Allen Brown
ATTORNEY

3,022,882
INFEED MECHANISM

James R. West, New Holland, Pa., assignor to Sperry Rand Corporation, New Holland, Pa., a corporation of Delaware Filed Dec. 19, 1957, Ser. No. 703,812
7 Claims. (Cl. 198—104)

The present invention relates generally to harvesters and more particularly to an improved infeed mechanism for a forage harvester of the type having a housing opened forwardly and adapted to receive crop material from an infeed mechanism mounted in front of it and of greater width than the housing opening.

Conventionally, such a harvester has cutting means as wide as the infeed mechanism, and the infeed mechanism includes a conveyor leading into the housing opening. There is no problem of conveying into the housing that portion of the cut crop in longitudinal register with the opening. However, that portion of the cut crop not in longitudinal register must be moved laterally to the opening. Generally, this is accomplished with augers, which cause the laterally disposed material to be merged with the material moving directly rearwardly. Problems are created in that the infeed mechanism tends to jam up at the discharge ends of the augers because the material coming from the augers is moving at a right angle to the rearwardly moving material. It has been found necessary to provide means for assisting in turning the material coming off the augers and for assisting the conveyor leading into the housing in moving the merged mass of material. Some of the devices provided heretofore for this purpose have been only partially successful. Other of these devices while being successful are relatively complicated and expensive.

One object of this invention is to provide an improved infeed mechanism of the character described wherein the discharge of material from the augers of the mechanism is facilitated.

Another object of this invention is to provide means for turning material coming off the discharge ends of the augers and merging it with material travelling across the discharge ends.

Another object of this invention is to provide improved means for assisting the conveyor leading into the harvester housing in delivering merged crop material.

A further object of this invention is to provide means which will accomplish the foregoing objects with a minimum of cost.

Other objects of this invention will be apparent hereinafter from the specification and from the recital in the appended claims.

Figure 1:
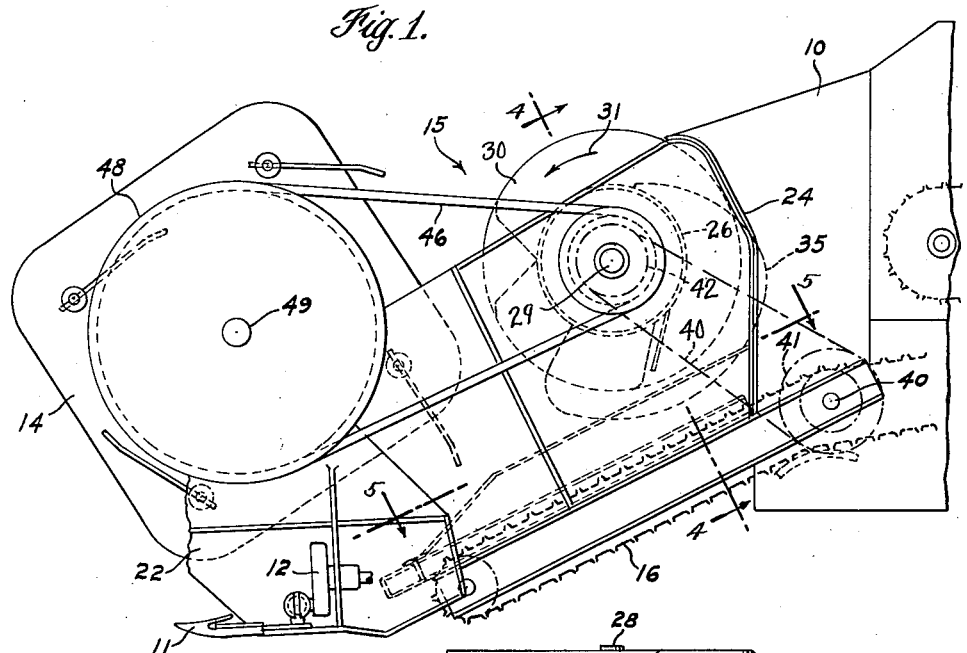
FIG. 1 is a fragmentary side elevation of the forward end of a forage harvester having an infeed mechanism constructed according to one embodiment of this invention.

Referring now to the drawings by numerals of reference, 10 denotes a forage harvester housing opened forwardly for the reception of crop material M. Such housing is supported on a suitable wheeled frame for movement across a field of crop material to be harvested and toward the left of FIG. 1. Housing 10 leads to a rearwardly mounted chopping mechanism which will comminute crop material delivered to it. Suitable means, usually a blower, either combined with or separate of the chopper conveys the material after it has been chopped into a trailing wagon. Such chopping and blowing structure is not shown since it plays no part in the present invention.

Disposed forwardly of housing 10 and adjacent the ground is a transverse cutter 11 operable to sever the standing crop. The length of the cutter is considerably greater than the width of the opening in housing 10. It is driven by conventional drive means 12, illustrated fragmentarily. Rotatable above cutter 11 and cooperative therewith is a reel 14 which urges the crop into the cutter and then sweeps the severed material rearwardly and upwardly to an infeed mechanism 15 constructed according to this invention.

Mechanism 15 comprises a floor in the form of an endless conveyor 16 of substantially the same width as the opening in housing 10. Conveyor 16 extends into the housing and downwardly and forwardly therefrom, terminating just rearwardly of the cutter 11. At each side of conveyor 16 is a platform 18 having an inclined forward end 19 and an inclined lateral surface 20 alongside the conveyor. Each platform extends at substantially the same angular inclination as conveyor 16. However, each platform is vertically spaced relative to the conveyor whereby a trough or pocket 21 (FIG. 4) is formed. Each platform 18 at its outside lateral edge, abuts against a vertical side wall 22 and at its rearward end against a vertical rear wall 24, both of which serve to prevent the escape of material from the infeed mechanism.

The combined width of conveyor 16 and platforms 18 is substantially the same as the length of cutter 11 and reel 14 whereby as material is severed it is swept not only onto the conveyor 16 but upon the laterally disposed platforms. The material deposited on conveyor 16 moves straight back and into the housing 10. The material swept rearwardly onto platforms 18 moves toward walls 24. Obviously, such material would merely pile up against walls 24 in the absence of means to convey it laterally to the opening in housing 10. Thus, lateral conveying means 25 is provided.

Conveying means 25 comprises a shaft or tubular body 26 disposed directly in front of housing 10. The shaft is supported at one end on a dead shaft 28 projecting through one of the side walls 22 and at its other end on a shaft 29 projecting through the other side wall 22. Shaft 26 has oppositely wound helical members 30 welded to it to form augers over each platform 18. The axial length of each auger is substantially the same as the width of the platform over which it is rotatable. The portion of shaft 26 over conveyor 16 has no auger flights. In essence, therefore, there are two coaxial augers having adjacent ends axially spaced.

Shaft 26 is adapted to be rotated as indicated by the arrow 31 in FIG. 1, and each auger section is such that it conveys material toward conveyor 16 and the pocket 21. Material moved by the augers slides over platforms 18 and then drops down onto conveyor 16 where it merges with the material on the conveyor.

While the material on conveyor 16 is moving in the proper direction, the material coming off the augers is moving perpendicular thereto and must be turned ninety degrees to feed it into housing 10. Conveyor 16, and the material thereon, exerts some turning action on the material coming off the augers. However, this turning action is ordinarily insufficient in most materials. Therefore, a kicker member in the form of a plate 35 is provided on the portion of shaft 26 over conveyor 16.

Figure 3:
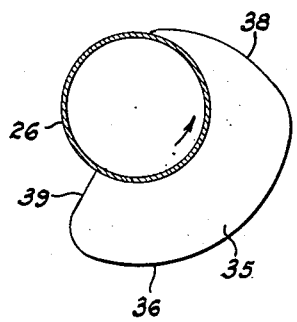
FIG. 3 is a sectional view showing the conveyor assist portion of the improved infeed mechanism of this invention.

Plate 35 extends radially of the shaft 26 such a distance that it is projectable below the level of platforms 18 and into the pocket 21. The configuration of the plate is shown best in FIG. 3. It includes a medial peripheral portion 36 concentric with the axis of shaft 26, a forward end 38 which extends from the periphery of shaft 26 to portion 36, and a rear end 39 generally perpendicular to the axis of shaft 26. Forward end 38 slopes rearwardly relative to the direction of rotation of the shaft, and the size or arcuate extent of plate 35 is only part of a circle whereby it projects into the pocket 21 once with each revolution of shaft 26.

The drive for conveyor 16, shaft 26 and reel 14 may take any desired form. In the structure illustrated, power is delivered to a shaft 40 (FIG. 1) for operating conveyor 16. A sprocket 41 is keyed to shaft 40. Trained around this sprocket and a first sprocket 42 keyed to the shaft 29 is an endless chain 40 which thereby drives shaft 26. Keyed to shaft 29 is a second sprocket 45. An endless belt 46 is passed around sprocket 45 and around a sprocket 48 keyed to the shaft 49 for supporting reel 14.

Figure 4:
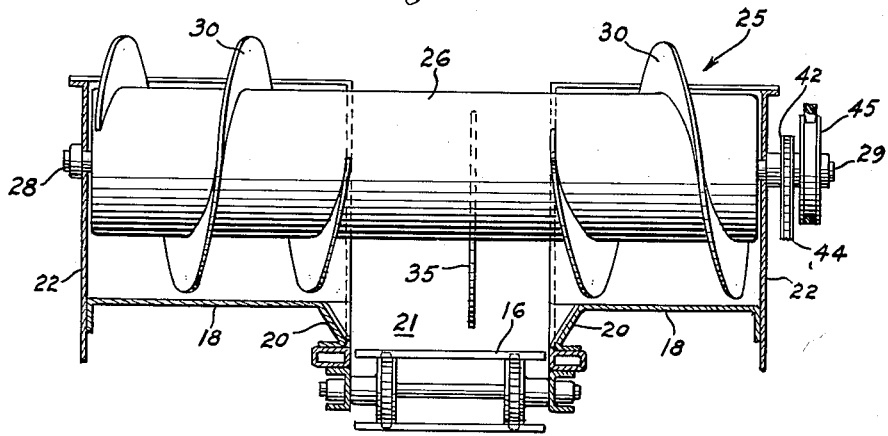
FIG. 4 is a section taken on the line 4—4 of FIG. 1 and looking in the direction of the arrows.
Figure 5:
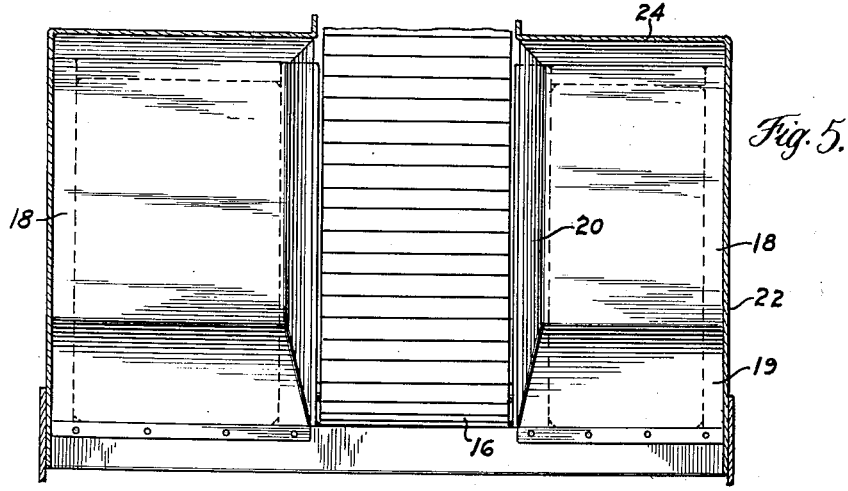
FIG. 5 is a section taken on the line 5—5 of FIG. 1 and looking in the direction of the arrows.

Trail behind forage harvesters are towed by a draw bar extending along one side of the harvester. The standing crop is approached from the opposite side of the machine, and there is somewhat of a greater abundance of material entering the machine from this side than from the one side. Thus, as shown in FIG. 4, one platform is somewhat wider than the other platform and the one auger is of greater axial length than the other auger. Moreover, since a greater abundance of material is discharged from one auger, the plate 35 is disposed off center relative to conveyor 16 and closer to the other auger. The relative disposition of these parts compensates for non uniform delivery of material to the infeed mechanism.

Operation

The standing crop material is severed by the cutter 11 and swept by the reel 14 rearwardly to the infeed mechanism. Reel 14 sweeps the material onto central floor or conveyor 16 and to the lateral platforms 18. The material deposited on conveyor 16 moves directly rearwardly and into the housing 10. The material deposited on the platforms 18 moves against the augers 30 and is conveyed laterally by them. The material moving laterally slides across the tops of platforms 18 and then drops downwardly onto conveyor 16. In view of the considerable open space provided above conveyor 16 material is readily discharged from the auger.

Figure 6:
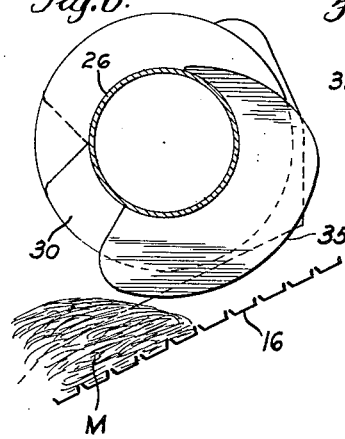
FIGS. 6, 7 and 8 are generally diagrammatic views illustrating the operation of applicant's improved infeed mechanism.
Figure 7:
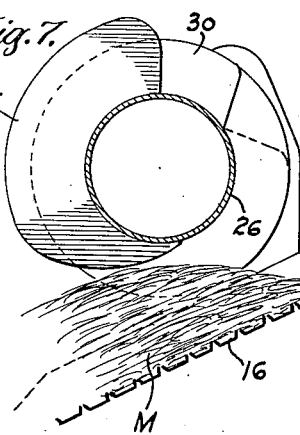
Figure 8:
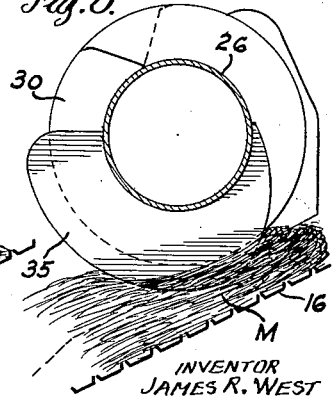

The movement of conveyor 16 toward the housing opening assists in turning the material coming off the augers toward the housing opening. To assist such turning, the plate 35 is intermittently operable. As shown in FIGS. 6–8, crop material moves up the conveyor 16. The plate 35 rotates from the position shown in FIG. 6 to the position shown in FIG. 7, where it is completely outside of pocket 21. The space under the shaft 26 is thus wide open for the reception of material. Thereafter, member 35 swings downwardly into the crop material pushing it upwardly and rearwardly. The leading end 38 is of such configuration that it "kicks" the material towards the housing 10. The fact that the plate 35 enters pocket 21 only intermittently, gives the infeed mechanism a chance to build up material in the pocket 21 which can then be pushed into housing 10. Material does not tend to hang on forward end 38 of plate 35 because of its curvature.

Figure 2:
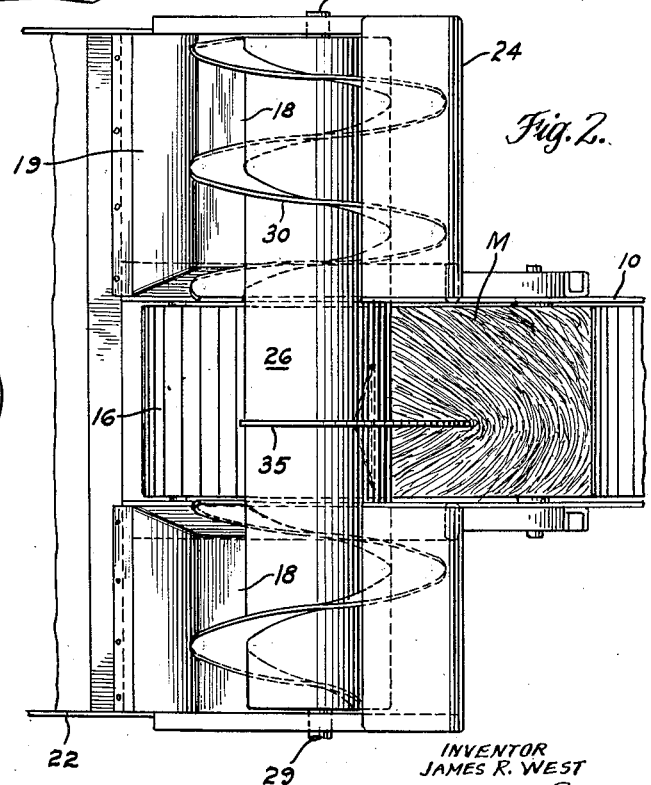
FIG. 2 is a fragmentary plan view of FIG. 1, and illustrating the form which the crop material takes as it leaves the infeed mechanism.

When long stemmy material is being harvested, such material may be of such length that it extends completely across the opening of housing 10. The plate 35 in moving against such material causes the entire mass of material being fed into the housing to bend as a V, the apex of which extends rearwardly. The form which the material assumes as it moves into the housing is shown best in FIG. 2. Suitable mechanism rearwardly of housing 10 receives the material as it is delivered.

When plate 35 is disposed as shown in FIG. 7, material is able to pass freely from the laterally disposed augers and into the pocket 21. Energy is not used in compressing the material against plate 35. Further, when the material is in the pocket 21 or extending all the way across the opening in housing 10, the plate 35 will engage it and bend it into a V for free flowing delivery into housing 10.

While the above structure is relatively simple and inexpensive, it overcomes a difficult problem in the harvesting art.

While this invention has been described in connection with a particular embodiment thereof, it will be understood that it is capable of further modification, and this application is intended to cover any variations, uses or adaptations of the invention following, in general, the principles of the invention and including such departures from the preset disclosure as come within known or customary practice in the art to which the invention pertains, and as fall within the scope of the invention or the limits of the appended claims.

Having thus described my invention what I claim is:

1. In a harvester having a housing provided with a forwardly directed opening, a mechanism for feeding crop material rearwardly into said opening comprising a pair of forwardly extending, relatively spaced platforms, one at each side of said opening, a floor extending forwardly from said opening between said platforms, a shaft rotatable about a generally stationary axis transverse to said floor, said shaft extending above said floor and laterally to each side thereof over said platforms, a pair of oppositely wound helical members carried on the laterally extending portions of said shaft and forming spaced augers for conveying material toward said floor, said floor being disposed below the level of said platforms and forming a pocket therebetween, the material conveyed by said augers sliding over said platforms and then dropping down onto said floor, and means carried on the portion of said shaft above said floor intermittently projectable below the level of said platforms and into said pocket and then movable rearwardly for feeding crop material through said opening, said feeding means comprising a plate connected to said shaft and extending radially thereof, the angular expanse of said plate and the rotation of said shaft being such that during each revolution of said shaft the plate is projected into said pocket, swept rearwardly and then extracted therefrom.

2. In a harvester having a housing provided with a forwardly directed opening, a mechanism for feeding crop material rearwardly into said opening comprising a pair of forwardly extending, coplanar, relatively spaced platforms, one at each side of said opening, a floor extending forwardly from said opening between said platforms, a shaft rotatable about a generally stationary axis transverse to said floor, said shaft extending above said floor and laterally to each side thereof over said platforms, a pair of oppositely wound helical members carried on the laterally extending portions of said shaft and forming spaced augers for conveying material toward said floor, said floor being disposed below the level of said platforms and forming a pocket therebetween, the material conveyed by said augers sliding over said platforms and then dropping down onto said floor, and means carried on the portion of said shaft above said floor intermittently projectable below the level of said platforms and into said pocket and then movable rearwardly for feeding crop material through said opening, said feeding means comprising a plate connected to said shaft and extending radially thereof, the angular expanse of said plate and the rotation of said shaft being such that during each revolution of said shaft the plate is projected into said pocket, swept rearwardly and then extracted, said plate having a medial peripheral portion concentric with the axis of rotation of said shaft, a crop engageable forward end extending from said shaft to said medial peripheral portion and curved rearwardly relative to the direction of rotation of said shaft, and a rear end extending generally perpendicular to the axis of said shaft.

3. In a harvester having a housing provided with a forwardly directed opening, a mechanism for feeding crop material rearwardly into said opening comprising a pair of forwardly extending, coplanar, relatively spaced platforms, one at each side of said opening, a floor extending forwardly from said opening between said platforms, a shaft rotatable about an axis transverse to said floor, said shaft extending above said floor and laterally to each side thereof over said platforms, a pair of oppositely wound helical members carried on the laterally extending portions of said shaft and forming spaced augers for conveying material toward said floor, the axial length of one of said augers and the width of the platform beneath it being greater than the axial length of the other auger and the width of the other platform, said floor being disposed below the level of said platforms and forming a pocket therebetween, the material conveyed by said augers sliding over said platforms and then dropping down onto said floor, and means carried on the portion of said shaft above said floor intermittently projectable below the level of said platforms and into said pocket and then movable rearwardly for feeding crop material through said opening, said feeding means being disposed on said shaft closer to said other auger than to said one auger.

4. In a harvester having a housing provided with a forwardly directed opening, means for feeding crop material into said opening comprising a conveyor extending forwardly from said opening and urging crop material deposited thereon rearwardly through said opening, a shaft rotatable about a generally stationary axis transverse to said conveyor, said shaft extending above said conveyor and laterally to one side thereof, a helical member affixed to the laterally extending portion of said shaft and forming therewith an auger for conveying material onto said conveyor, a platform beneath said auger and vertically spaced relative to said conveyor to form a pocket therewith whereby when material is conveyed by the auger it slides over said platform and then drops down onto the conveyor, and means connected to said shaft above said conveyor intermittently projectable below the level of said platform into material on said conveyor and then movable rearwardly to assist in feeding crop material through said opening, said assist means comprising a plate connected to said shaft and extending radially thereof, the radius of said plate being such that it is projectable below the level of said platform and into said pocket, the angular expanse of said plate and the rotation of said shaft being such that during each revolution of said shaft the plate is projected into said pocket, swept rearwardly and then extracted therefrom, said plate having a medial peripheral portion concentric with the axis of rotation of said shaft, a crop engageable forward portion extending from said shaft to said medial peripheral portion and curved rearwardly relative to the direction of rotation of said shaft, and a rear end extending generally perpendicular to the axis of said shaft.

5. In a forage harvester, a rotatable shaft, a pair of oppositely wound helical auger blades the radial inner edges of which are fastened to said shaft, said auger blades being disposed in axially spaced relationship, the portion of said shaft between the adjacent ends of said auger blades having a plate affixed to it extending radially of said shaft, the radial projection of said plate being greater than the radial projection of said auger blades, said plate having a medial peripheral portion concentric with the axis of rotation of said shaft, a forward portion extending from said shaft to said medial portion and curved rearwardly relative to the direction of rotation of said shaft, and a rear portion extending generally perpendicular to the axis of said shaft.

6. In a forage harvester, a rotatable shaft, a pair of oppositely wound helical auger blades the radial inner edges of which are fastened to said shaft, said auger blades being disposed in axially spaced relationship and one of the auger blades being of greater axial length than the other auger blade, the portion of said shaft between the adjacent ends of said auger blades having a plate affixed to it extending radially of said shaft, said plate being mounted closer to said one auger blade than to said other auger blade and projecting radially from said shaft a greater distance than the radial projection of said auger blades.

7. In a forage harvester, a rotatable shaft, a helical auger blade the radial inner edge of which is fastened to said shaft, said auger blade extending from one end of said shaft to a point spaced from the other end of the shaft, the other end of said shaft having a radially extending plate affixed thereto whereby the plate travels in a circular path around the axis of the shaft, said plate being spaced from the adjacent end of said auger blade and having a radial projection greater than the radial projection of the auger blade.

References Cited in the file of this patent

UNITED STATES PATENTS

| | | |
|---|---|---|
| 1,487,882 | Parker | Mar. 25, 1924 |
| 2,315,091 | Fees | Mar. 30, 1943 |
| 2,470,704 | Korsmo et al. | May 17, 1949 |
| 2,514,945 | Fortier | July 11, 1950 |
| 2,529,180 | Oehler | Nov. 7, 1950 |
| 2,696,288 | Ball | Dec. 7, 1954 |
| 2,724,481 | Oswalt | Nov. 22, 1955 |
| 2,778,483 | Nikkel | Jan. 22, 1957 |
| 2,851,144 | Carroll | Sept. 9, 1958 |

FOREIGN PATENTS

| | | |
|---|---|---|
| 529,342 | Canada | Aug. 21, 1956 |
| 578,035 | Great Britain | June 12, 1946 |